United States Patent
McClory et al.

(10) Patent No.: US 11,962,046 B2
(45) Date of Patent: Apr. 16, 2024

(54) SYSTEM AND METHOD FOR DIRECTLY MONITORING THE CONDUCTIVITY OF COOLANT USED TO REGULATE THE TEMPERATURE A FUEL CELL

(71) Applicant: Toyota Motor Engineering & Manufacturing North America, Inc., Plano, TX (US)

(72) Inventors: Matthew K. McClory, Aliso Viejo, CA (US); Daniel Charles Folick, Long Beach, CA (US); Dakota Kelley, Garland, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/564,403

(22) Filed: Dec. 29, 2021

(65) Prior Publication Data

US 2023/0207840 A1    Jun. 29, 2023

(51) Int. Cl.
*H01M 8/04029* (2016.01)
*H01M 8/04537* (2016.01)

(52) U.S. Cl.
CPC ... *H01M 8/04029* (2013.01); *H01M 8/04634* (2013.01)

(58) Field of Classification Search
CPC ............ H01M 8/04029; H01M 8/04634
See application file for complete search history.

(56) References Cited

U.S. PATENT DOCUMENTS

| | | | |
|---|---|---|---|
| 9,068,922 B2 | 6/2015 | Foley | |
| 2004/0170877 A1* | 9/2004 | Wakabayashi | C02F 1/42 429/410 |
| 2005/0058868 A1* | 3/2005 | Taga | H01M 8/04044 429/434 |
| 2012/0326516 A1 | 12/2012 | Gurunathan et al. | |
| 2016/0172690 A1* | 6/2016 | Park | H01M 8/04029 429/437 |
| 2019/0288304 A1* | 9/2019 | Ikoma | H01M 8/02 |
| 2020/0099070 A1* | 3/2020 | Takagaki | H01M 8/04044 |
| 2021/0104762 A1* | 4/2021 | Park | H01M 8/04768 |

FOREIGN PATENT DOCUMENTS

WO    2013037031 A1    3/2013

OTHER PUBLICATIONS

Bozzolo, M. et al., "Moving Toward Climate Neutrality—Fuel Cell Technology for Future Energy and Propulsion Systems", MTU Solutions, Nov. 18, 2020.

* cited by examiner

*Primary Examiner* — Stewart A Fraser
(74) *Attorney, Agent, or Firm* — Christopher G. Darrow; Darrow Mustafa PC

(57) ABSTRACT

Described are systems and methods for directly monitoring the conductivity of the coolant used to regulate the temperature of a fuel cell. The system includes a coolant loop that acts as a conduit for the coolant, an ion exchanger configured to deionize the coolant, and a conductivity sensor configured to output an electrical signal indicating a conductivity of the coolant. The system also includes a processor in communication with the conductivity sensor and a memory having instructions that, when executed by the processor, cause the processor to determine the conductivity of the coolant based on the electrical signal from the conductivity sensor and determine when the ion exchanger requires servicing based on the conductivity of the coolant.

7 Claims, 5 Drawing Sheets

SYSTEM AND METHOD FOR DIRECTLY MONITORING THE CONDUCTIVITY OF COOLANT USED TO REGULATE THE TEMPERATURE A FUEL CELL

TECHNICAL FIELD

The subject matter described herein relates, in general, to systems and methods for directly monitoring the conductivity of coolant used to regulate the temperature of a fuel cell.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Fuel cells are electrochemical cell that converts the chemical energy of a fuel and an oxidizing agent into electricity through a pair of redox reaction. Fuel cells generally include an anode, a cathode, and an electrolyte that allows ions, often positively charged hydrogen ions, to move between the two sides of the fuel cell. At the anode, a catalyst causes the fuel to undergo oxidation reactions that generate ions and electrons. The ions move from the anode to the cathode through the electrolyte. At the same time, electrons flow from the anode to the cathode through an external circuit, producing direct current electricity. Another catalyst causes ions, electrons, and oxygen to react at the cathode, forming water and possibly other products.

Some fuel cells require the use of coolant to properly regulate the temperature of the fuel cell. The coolant passes through the fuel cell and is then provided to a heat exchanger. However, during this process, corrosion from the fuel cell and other pollutants may accumulate within the coolant. This accumulation increases the conductivity of the coolant, which may result in short-circuiting, induce galvanic corrosion, and electrolyze the coolant, reducing efficiency. Fuel cell coolant systems may employ ion exchangers that effectively filter out ions from the current to prevent these drawbacks from occurring.

However, the ion exchangers must be routinely serviced to operate properly. Currently, maintenance schedules are time-based, wherein one or more parts of the ion exchanger are replaced after a period of time—either operational or static—has expired. This results in situations where the ion exchanger may be serviced unnecessarily, resulting in unnecessary maintenance costs. More concerning are situations where the ion exchanger requires service but will not be serviced based on a maintenance schedule. In these situations, significant damage to the fuel cell may, or safety issues may arise.

SUMMARY

This section generally summarizes the disclosure and does not comprehensively explain its full scope or all its features.

In one embodiment, a system includes a coolant loop that acts as a conduit for the coolant, an ion exchanger configured to deionize the coolant, and a conductivity sensor configured to output an electrical signal indicating a conductivity of the coolant. The system also includes a processor in communication with the conductivity sensor and a memory having instructions that, when executed by the processor, cause the processor to determine the conductivity of the coolant based on the electrical signal from the conductivity sensor and determine when the ion exchanger requires servicing based on the conductivity of the coolant.

In another embodiment, a system includes a coolant loop that acts as a conduit for the coolant, an ion exchanger configured to deionize the coolant, a reservoir, and a conductivity sensor configured to output an electrical signal indicating a conductivity of the coolant. In this embodiment, the conductivity sensor is connected to the reservoir to minimize flow restrictions of the coolant through the coolant loop Like before, the system also includes a processor in communication with the conductivity sensor and a memory having instructions that, when executed by the processor, cause the processor to determine the conductivity of the coolant based on the electrical signal from the conductivity sensor and determine when the ion exchanger requires servicing based on the conductivity of the coolant.

In yet another embodiment, a method includes determining a conductivity of a coolant located within a coolant loop for cooling a fuel cell based on an electrical signal from a conductivity sensor and determining when an ion exchanger requires servicing based on the conductivity of the coolant.

Further areas of applicability and various methods of enhancing the disclosed technology will become apparent from the description provided. The description and specific examples in this summary are intended for illustration only and do not limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described are systems and methods for directly monitoring the conductivity of coolant used to regulate the temperature of a fuel cell. A fuel cell system may include a fuel cell and a coolant loop that acts as a conduit for providing coolant to a fuel cell. Heat generated by the fuel cell during the operation of the fuel cell is transferred to a heat exchanger by the use of the coolant passing through the coolant loop. As explained previously, corrosion from the fuel cell and other pollutants may accumulate within the coolant, causing the coolant to become more conductive over time. While an ion exchanger connected to the coolant loop can reduce the presence of ions within the coolant, the ion exchanger will nevertheless need to be serviced at appropriate times in order for it to function properly and prevent the coolant from becoming too conductive.

A determination of when the ion exchanger should be serviced can be based on the conductivity of the coolant. As such, the system also includes a conductivity sensor that is fluidly connected to the coolant loop or a reservoir. The conductivity sensor outputs an electrical signal that represents the conductivity of the coolant. A processor receives this electrical signal and determines the conductivity of the coolant, which can then be used to determine when the ion exchanger should be serviced.

Figure 1A:
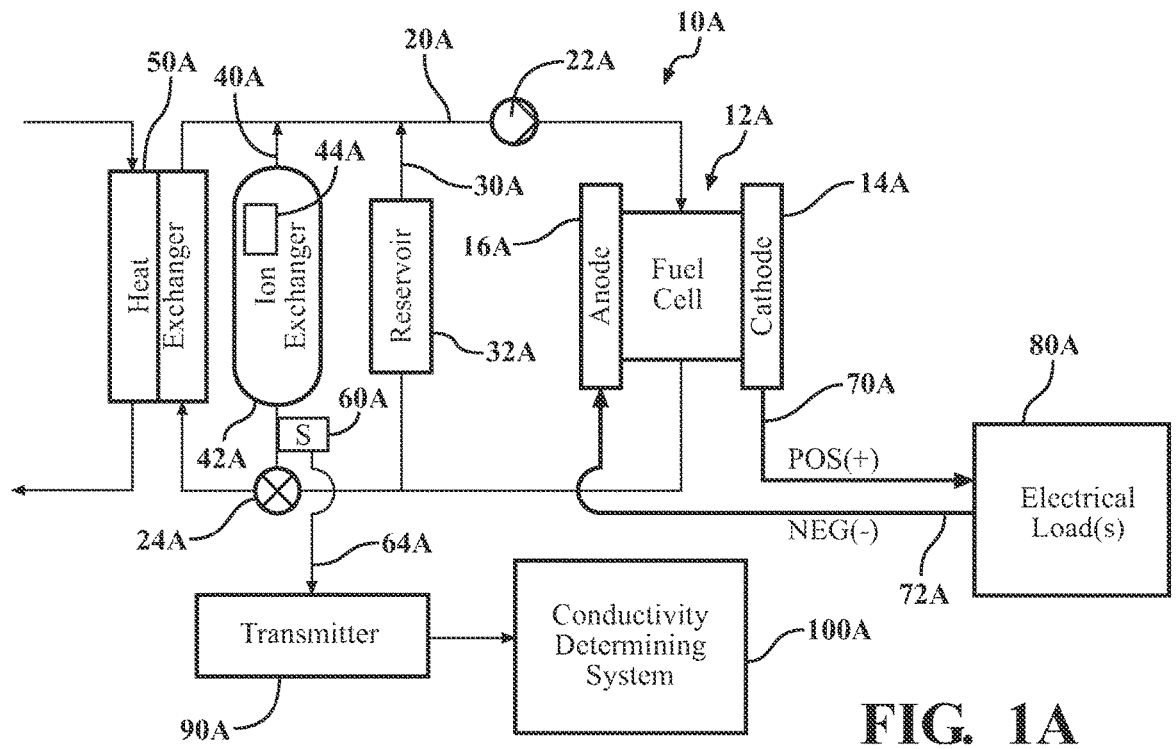
FIGS. 1A-1C illustrates different examples of fuel cell systems having coolant loops and a conductivity determining system that directly monitors the conductivity of coolant used to regulate the temperature of the fuel cell systems.

Referring to FIG. 1A, illustrated is one example of a fuel cell system 10A that utilizes a conductivity determining system 100A. The fuel cell system 10A may include a fuel cell 12A having a cathode 14A and an anode 16A. The fuel cell 12A is an electrochemical cell that converts the chemical energy of a fuel, such as hydrogen, and an oxidizing agent, such as oxygen, into electricity through a pair of redox reactions. While only one fuel cell 12A is illustrated, it should be understood that the fuel cell system 10A can include any number of fuel cells.

During the operation of the fuel cell 12A, an electrolyte allows ions to move between the two sides of the fuel cell 12A. At the anode 16A, a catalyst causes the fuel to undergo oxidation reactions that generate ions and electrons. The ions move from the anode 16A to the cathode 14A through the electrolyte. At the same time, electrons flow from the anode 16A to the cathode 14A through one or more electrical load(s) 80A, producing direct current electricity. At the cathode 14A, another catalyst causes ions, electrons, and oxygen to react, forming water and possibly other products. The current generated by the fuel cell 12A is provided from the cathode 14A of the fuel cell to the electrical load(s) 80A via an electrical line 70A. As this current passes through the electrical load(s) 80A, it is then sent to the anode 16A of the fuel cell 12A via an electrical line 72A.

The electrical load(s) 80A can be any type of electrical device or devices. In one example, the electrical load(s) 80A could be one or more batteries utilized to store electricity generated by the fuel cell 12A that will later be utilized in one or more applications. In other examples, the electrical load(s) 80A could be one or more inverters that convert the direct current from the fuel cell 12A into alternating current that may provide power to a building. Again, the electrical load(s) 80A can vary significantly from application to application and should not be limited to the abovementioned examples.

The fuel cell 12A may require cooling that is provided by a coolant loop 20A. The coolant utilized in the coolant loop 20A can be any one of a number of different coolants, such as deionized water or a mixture of ethylene glycol and deionized water. The coolant is provided to the fuel cell 12A by a pump 22A. After the coolant passes through the fuel cell 12A, it is provided to a heat exchanger 50A that will transfer heat within the coolant to another system.

Also fluidly connected to the coolant loop 20A is a reservoir 32A that holds excess coolant and allows air or other gases within the coolant loop 20A to accumulate and be replaced by coolant as it circulates throughout the coolant loop 20A. The reservoir 32A is connected to the coolant loop 20A by a bypass 30A.

The coolant loop 20A also includes a valve 24A that directs a portion of the coolant through an ion exchanger 42A via a bypass 40A. The ion exchanger 42A may include ion exchanger components 44A that can include one or more filters or other components, such as cartridges that may require routine replacement. The ion exchanger 42A may remove metal ions from the coolant by adsorbing the metal ions on an ion exchange resin. Effectively, the ion exchanger 42A may remove ions from the coolant to reduce the conductivity of the coolant. As explained previously, corrosion from the fuel cell 12A and other pollutants may accumulate within the coolant, increasing the conductivity of the coolant. As a coolant increases in conductivity, the efficiency of the fuel cell 12A decreases. As such, the ion exchanger 42A may need to be serviced routinely to function properly such that ions are removed from the coolant.

In this example, the conductivity of the coolant is measured by using a conductivity sensor 60A that is fluidly connected to the bypass 40A such that it can measure the conductivity of nearby coolant. The conductivity sensor 60A can be any type of conductivity sensor that can measure the conductivity of a liquid sample, such as the coolant used to regulate the temperature of the fuel cell 12A. In one example, the conductivity sensor 60A measures the ability of the coolant to conduct an electric current between two electrodes. In the coolant, the current between the electrodes flows by ion transport. Therefore, an increasing concentration of ions in the coolant will result in higher conductivity values. Generally, conductivity is measured in MicroSiemens per centimeter ($\mu$S/cm).

The conductivity sensor 60A, as stated before, measures the conductivity of the coolant and outputs an electrical signal 64A that is based on the measured conductivity. The electrical signal may be an analog signal or may be a digital signal. The electrical signal 64A may be provided directly to the conductivity determining system 100A or may be provided to the conductivity determining system 100A via a transmitter 90A. The transmitter 90A may allow the wired or wireless transmission of the electrical signal 64A from the conductivity sensor 60A to the conductivity determining system 100A.

The example shown in FIG. 1A, the conductivity sensor 60A is fluidly connected to the bypass 40A that also includes the ion exchanger 42A. However, it should be understood that the conductivity sensor could be connected to other parts of the coolant loop. For example, referring to FIG. 1B, this example illustrates that the conductivity sensor 60B is fluidly connected to the coolant loop 20B upstream from the fuel cell 12B. Like reference numerals have been utilized to refer to like elements and therefore the previous description of these elements is equally applicable to the example given in FIG. 1B.

Figure 1B:
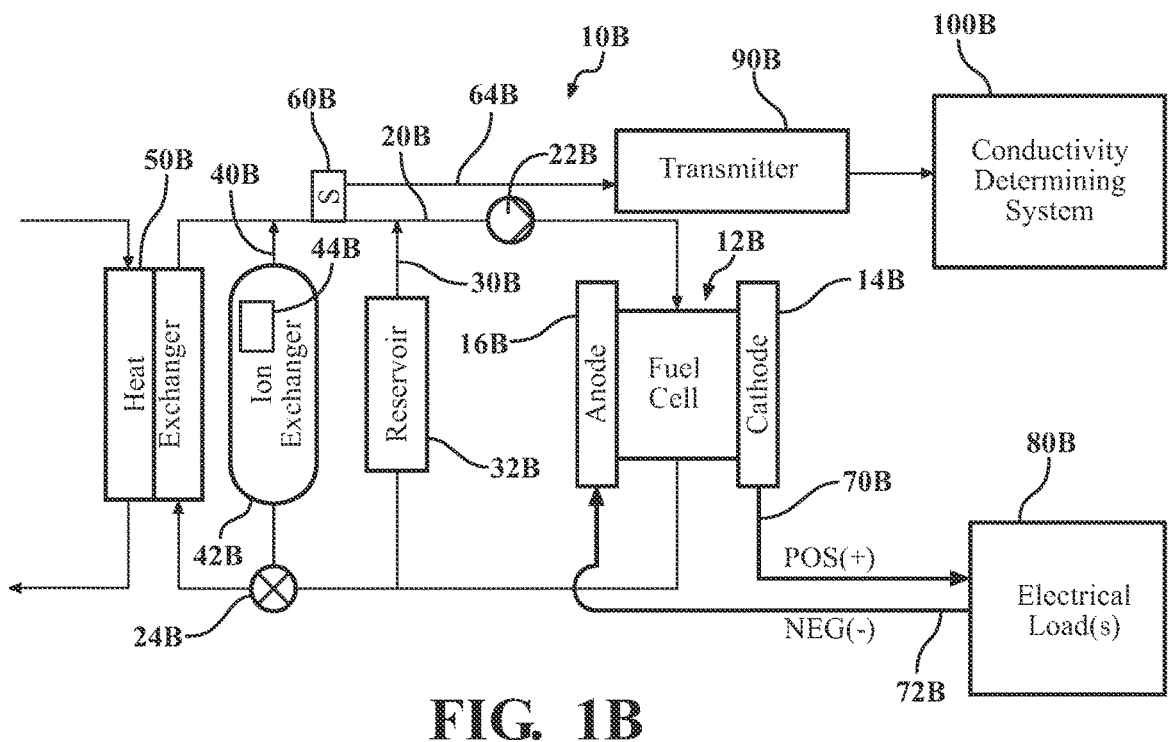
Figure 1C:
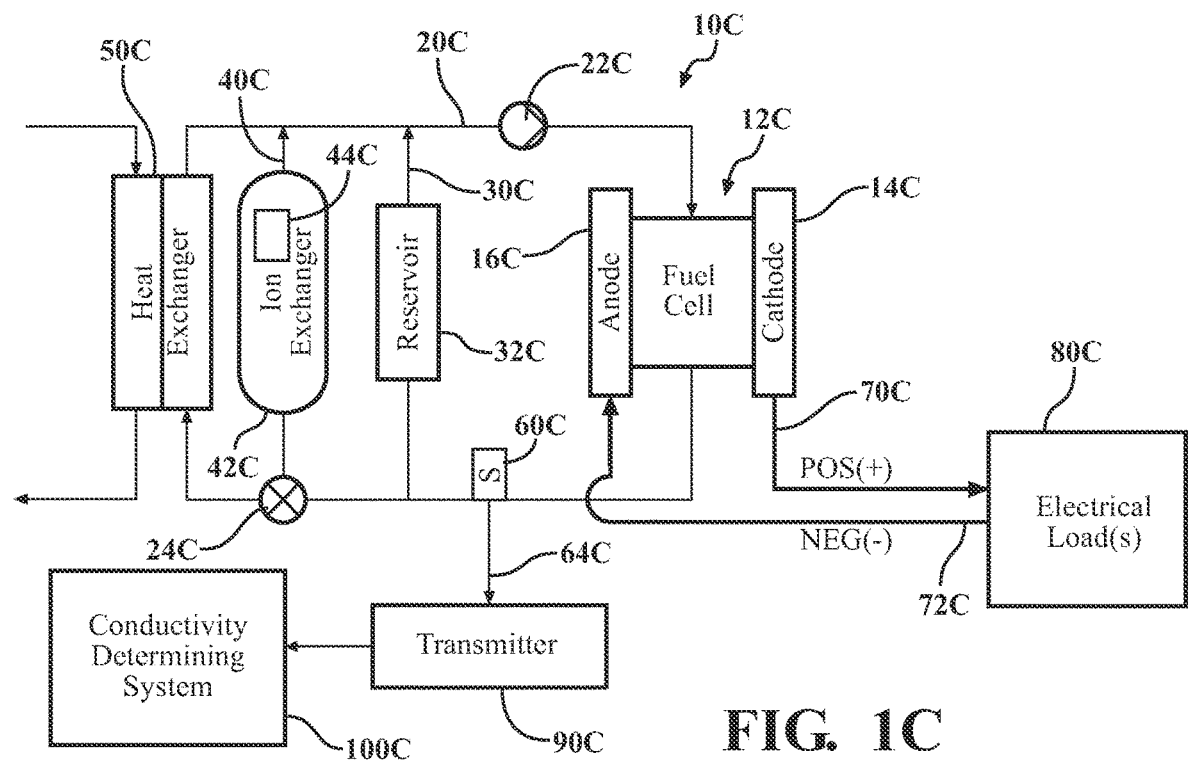
Figure 3:
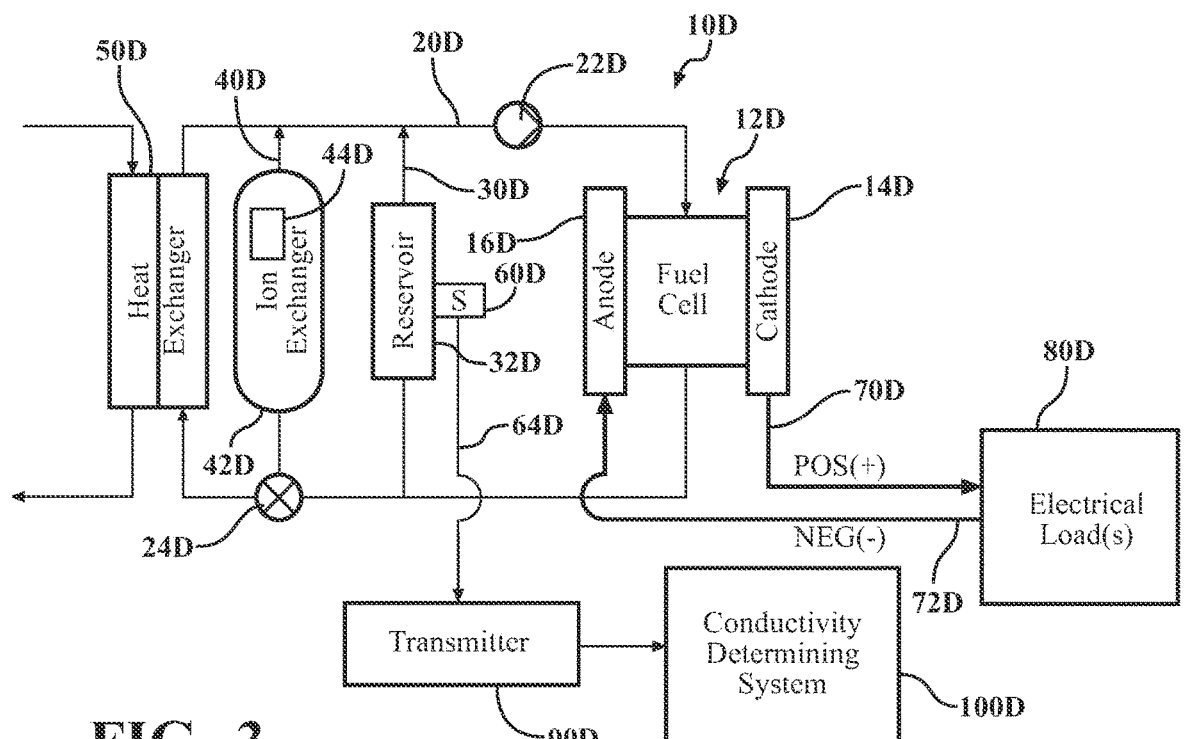
FIG. 3 illustrates an example of a fuel cell system having a coolant loop and a conductivity determining system that directly monitors the conductivity of coolant within a reservoir.

Further still, in the example shown in FIG. 1C, the conductivity sensor 60C is fluidly connected to the coolant loop 20C downstream from the fuel cell 12C Like before, like reference numerals have been utilized to refer to like elements and therefore the previous description of these elements is equally applicable to the example given in FIG. 1C. Also, as will be explained in greater detail later, another example illustrated in FIG. 3 illustrates the conductivity sensor 60D being fluidly connected to the reservoir 32D.

Figure 2:
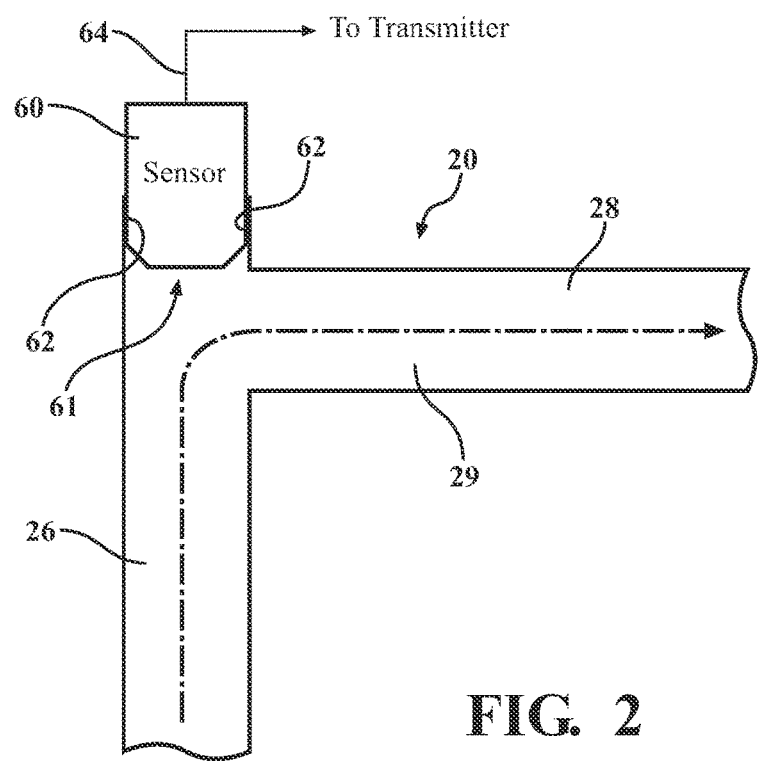
FIG. 2. illustrates a more detailed view of the connection of conductivity sensors to the coolant loops of the fuel cell systems of FIGS. 1A-1C.

As to the example shown in FIGS. 1A, 1B, and 1C, the conductivity sensors 60A, 60B, and 60C are fluidly connected to the bypass 40A, the coolant loop 20B, and the coolant loop 20C, respectively. While the connection of the conductivity sensors 60A-60C to the coolant loops or bypasses can vary from application to application, one example of a connection of a conductivity sensor 60 to coolant loop 20 is shown in FIG. 2.

Here, the coolant loop 20, which may be similar to the coolant loops 20A-20B or the bypass 40A, includes a first portion 26 and a second portion 28. Coolant entering the first portion 26 generally follows a path 29 along the length of the first portion 26, continuing along the length of the second portion 28. In this example, second portion 28 may have been spliced into the first portion 26.

The conductivity sensor 60 may be located within an opening 61 of the first portion 26. The creation of the opening 61 may have been caused by the splicing of the second portion 28 into the first portion 26 of the coolant loop 20. Sidewalls 62 of the first portion 26 defining the opening 61 may be dimensioned such that they can frictionally engage portions of the conductivity sensor 60 to hold the conductivity sensor 60 in place. In one example, the sidewalls 62 form a sensor mount and may be threaded such that the conductivity sensor 60 is essentially screwed into the sidewall 62, holding the conductivity sensor 60 in place.

As fluid passes from the first portion 26 to the second portion 28 of the coolant loop 20, the conductivity sensor 60 can measure the conductivity of the coolant flowing near one or more electrodes of the conductivity sensor 60. As stated before, the conductivity sensor 60 outputs an electrical signal 64 to either the conductivity determining systems 100A-100C directly or via the transmitters 90A-90C.

Referring to FIG. 3, another example of a fuel cell system 10D is shown. In this example, like reference numerals have been utilized to refer to like elements and so any description regarding these elements is equally applicable to this example. Here, the conductivity sensor 60D is fluidly connected to the reservoir 32D. This example may be advantageous because placing the conductivity sensor 60D so that it is fluidly connected to the reservoir 32D, flow restriction caused by the placement of a sensor in either a bypass or any part of the coolant loop can be avoided.

Figure 4:
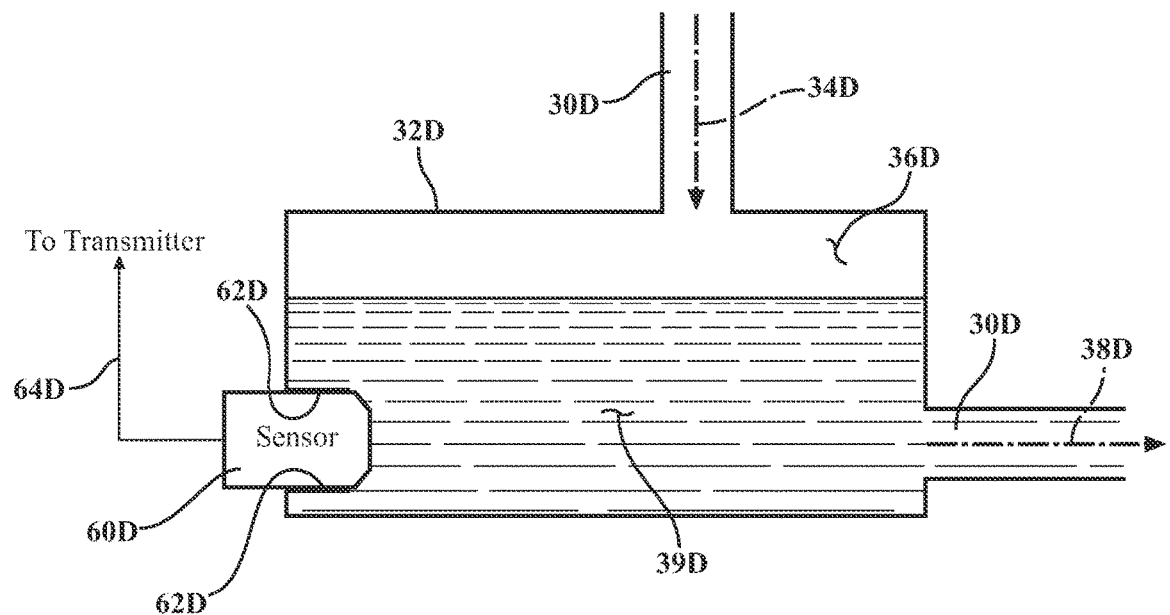
FIG. 4. illustrates a more detailed view of the connection of a conductivity sensor to the reservoir of the fuel cell system of FIG. 3.

FIG. 4 illustrates one example of how the conductivity sensor 60D may be connected to the reservoir 32D. In this example, the reservoir 32D includes a storage area 36D that stores the coolant 39D that enters the reservoir 32D is indicated by the arrow 34D. The coolant exits the reservoir 32D as indicated by the arrow 38D. The conductivity sensor 60D may be placed such that it is fluidly connected to the storage area 36D of the reservoir 32D. In one example, the placement of the conductivity sensor 60D may be such that the electrodes within the conductivity sensor 60D are completely submerged within the coolant 39D. By submerging the electrodes of the conductivity sensor 60D within the coolant 39D, the conductivity sensor 60D can measure the conductivity of the coolant 39D that is within the reservoir 32D. As stated before, the conductivity sensor 60D outputs an electrical signal 64D to either the conductivity determining system 100D directly or via the transmitter 90D.

The reservoir 24D may include sidewalls 62D that are shaped to frictionally engage and hold the conductivity sensor 60D in place. In one example, the sidewalls 62D form a sensor mount and may be threaded such that the conductivity sensors 60D is screwed into the reservoir 32D.

Figure 5:
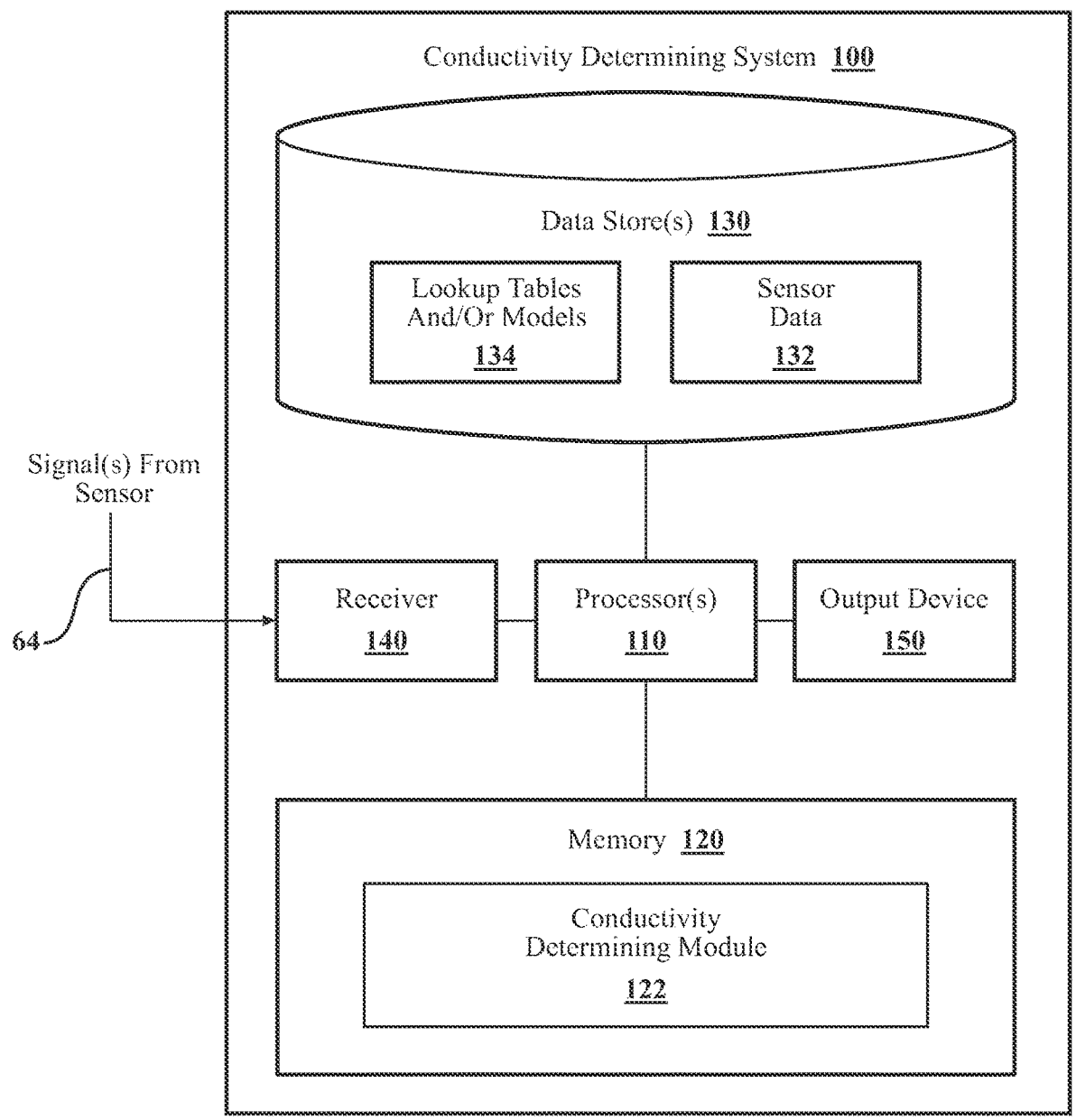
FIG. 5 illustrates a more detailed view of a conductivity determining system.

As to the conductivity determining systems 100A-100D shown in FIGS. 1A-1C and 3, reference is made to FIG. 5.

Here, illustrated is a conductivity determining system 100, which may be similar to the conductivity determining systems 100A-100D. As shown, the conductivity determining system 100 may be a programmable logic controller and includes one or more processor(s) 110. Accordingly, the processor(s) 110 may be a part of the conductivity determining system 100 or the conductivity determining system 100 may access the processor(s) 110 through a data bus or another communication path. In one or more embodiments, the processor(s) 110 is an application-specific integrated circuit that is configured to implement functions associated with a conductivity determining module 122. In general, the processor(s) 110 is an electronic processor such as a microprocessor that is capable of performing various functions as described herein.

In one embodiment, the conductivity determining system 100 includes a memory 120 that stores the conductivity determining module 122. The memory 120 may be a random-access memory (RAM), read-only memory (ROM), a hard disk drive, a flash memory, or other suitable memory for storing the conductivity determining module 122. The conductivity determining module 122 is, for example, computer-readable instructions that, when executed by the processor(s) 110, cause the processor(s) 110 to perform the various functions disclosed herein.

Furthermore, in one embodiment, the conductivity determining system 100 includes one or more data store(s) 130. The data store(s) 130 is, in one embodiment, an electronic data structure such as a database that is stored in the memory 120 or another memory and that is configured with routines that can be executed by the processor(s) 110 for analyzing stored data, providing stored data, organizing stored data, and so on. Thus, in one embodiment, the data store(s) 130 stores data used by the conductivity determining module 122 in executing various functions.

In this example, the data store(s) 130 may store the sensor data 132 that may be data provided to the conductivity determining system 100 by the conductivity sensors 60A-60D in the form of electrical signals 64A-64D, represented in FIG. 5 as electrical signal 64. As stated before, when describing electrical signals 64A-64D, the electrical signal 64 contains the data measured by a conductivity sensor, such as the conductivity sensors 60A-60D. The electrical signal 64 may be provided directly to the conductivity determining system 100 or indirectly via a transmitter, such as the transmitters 90A-90D. The sensor data 132 may be data indicating the conductivity of the coolant as measured by a conductivity sensor.

The data store(s) 130 may also include one or more models or lookup tables 134. As stated previously, a conductivity sensor outputs an electrical signal 64 that represents the conductivity of the coolant and is stored as the sensor data 132. However, to interpret the electrical signals that are stored within the sensor data 132, the models and/or lookup tables 134 may be utilized by the processor(s) 110 to determine one or more values that indicate the conductivity of the coolant and/or when an ion exchanger, such as the ion exchangers 42A-42D, should be serviced.

In situations where lookup tables are utilized, values of the electrical signal 64 stored in the sensor data 132 may be cross-referenced with a value that indicates the conductivity of the coolant (for example, in MicroSiemens per cm) and/or when the ion exchanger should be serviced. In situations where models are utilized, one or more equations, neural networks, or other methodologies may be utilized to convert the sensor data 132 into one or more values indicating the conductivity of the coolant and/or when the ion exchanger should be serviced.

The conductivity determining system 100 may also include a receiver 140 that is in communication with the processor(s) 110 for receiving information from a transmitter such as transmitters 90A-90D, or even directly from a conductivity sensor, such as conductivity sensors 60A-60D. In one example, the receiver 140 may be a wired or wireless receiver that can receive signals and convert these signals to be stored as sensor data 132.

The conductivity determining system 100 may also include an output device 150 that is in communication with the processor(s) 110. The output device 150 can be any output device that can provide information to an operator or another system regarding the conductivity of the coolant determined by the conductivity determining system 100 and/or an indication when an ion exchanger should be serviced. As such, the output device 150 could be a display device, audible device, haptic feedback device, or an electrical output to another system.

As to the conductivity determining module 122, the conductivity determining module 122 includes instructions that cause the processor(s) to perform any one of a number of different methodologies disclosed in this specification. In one example, the conductivity determining module 122 includes instructions that, when executed by the processor(s) 110, cause the processors(s) 110 to receive the electrical signal 64 from a conductivity sensor, such as the conductivity sensors 60A-60D. As stated before, the electrical signal 64 may be stored as sensor data 132. The processor(s) 110 may receive this signal directly or may receive it after it is stored in the sensor data 132.

The conductivity determining module 122 may also include instructions that, when executed by the processor(s) 110, cause the processors(s) 110 to determine the conductivity of the coolant based on the electrical signal 64 from the conductivity sensor. The coolant's conductivity may be determined by using the models and/or lookup tables 134 by the processor(s) 110 to determine one or more values that indicate the conductivity of the coolant. In one example, the value of the electrical signal 64 is converted into a conductivity value using either the models and/or lookup tables 134.

The conductivity determining module 122 may also include instructions that, when executed by the processor(s) 110, cause the processors(s) 110 to determine when the ion exchanger, such as the ion exchangers 42A-42D, should be serviced. Service may include changing the ion exchangers 42A-42D or ion exchanger components 44A-44D, such as one or more filters or cartridges. The determination of when the ion exchanger should be serviced may be provided to the output device 150. Service can also include forcing extra coolant should through the ion exchanger at a higher flowrate to perform a deliberate de-ionization. A higher flowrate is in comparison to a steady-state flowrate that typically indicates the flowrate of the coolant through the coolant loop. The determination of when the ion exchanger should be serviced may be based on a threshold value. If the conductivity of the coolant exceeds a threshold value, the conductivity determining module 122 may cause the processors(s) 110 to determine that the ion exchanger requires service.

Figure 6:
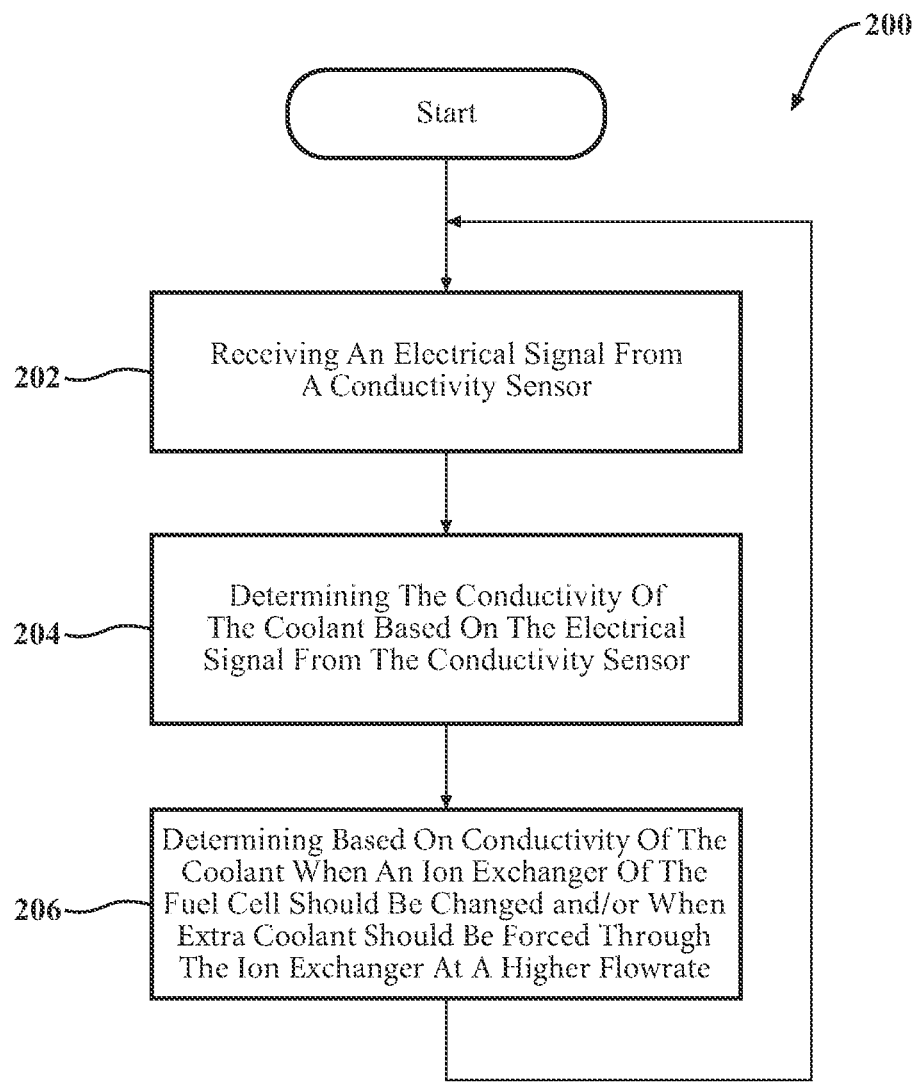
FIG. 6 illustrates a method for directly monitoring the conductivity of coolant used to regulate the temperature of a fuel cell system, such as the fuel cell systems of FIGS. 1A-1C and FIG. 3.

Referring to FIG. 6, a method 200 for directly monitoring the conductivity of coolant used to regulate the temperature of a fuel cell system is shown. The method 200 will be described from the viewpoint of the fuel cell system 10A-10D of FIGS. 1A-1C and 3 and the conductivity determining system 100 of FIG. 5. However, it should be understood that this is just one example of implementing the method 200. While method 200 is discussed in combination with the conductivity determining system 100, it should be appreciated that the method 200 is not limited to being implemented within the conductivity determining system 100, but is instead one example of a system that may implement the method 200.

In step 202, the conductivity determining module 122 causes the processors(s) 110 to receive the electrical signal 64 from a conductivity sensor, such as the conductivity sensors 60A-60D. As stated before, the electrical signal 64 may be stored as sensor data 132. The processor(s) 110 may receive this signal directly or may receive it after it is stored in the sensor data 132.

In step 204, the conductivity determining module 122 causes the processors(s) 110 to determine the conductivity of the coolant based on the electrical signal 64 from the conductivity sensor. As stated before, the coolant's conductivity may be determined by using the models and/or lookup tables 134 by the processor(s) 110 to determine one or more values that indicate the conductivity of the coolant.

In step 206, the conductivity determining module 122 causes the processors(s) 110 to determine when the ion exchanger, such as the ion exchangers 42A-42D, should be serviced. The determination of when the ion exchanger should be serviced may be provided to the output device 150. Service may include changing the ion exchangers 42A-42D or ion exchanger components 44A-44D, such as one or more filters or cartridges. Service can also include forcing extra coolant should through the ion exchanger at a higher flowrate to perform a deliberate de-ionization. A higher flowrate is in comparison to a steady-state flowrate that typically indicates the flowrate of the coolant through the coolant loop. The conductivity determining module 122 may cause the processor(s) 110 to automatically run the fuel cell in a predetermined maintenance operation specifically designed to force extra coolant at a higher flowrate through the ion exchangers 42A-42D by properly actuating the pumps 22A-22D and the three-way valves 24A-24D, respectively.

From there, the method 200 may end or may return to step 202. It may be advantageous to have the method 200 return to step 202 and run continuously to continually monitor the conductivity of the coolant utilized to regulate the temperature of a fuel cell to determine when it is appropriate to service the ion exchangers 42A-42D By so doing, the ion exchangers 42A-42D will be serviced when it is necessary, saving both time and cost while also preventing damage to the fuel cell systems 10A-10D.

It should be appreciated that any of the systems described in this specification can be configured in various arrangements with separate integrated circuits and/or chips. The circuits are connected via connection paths to provide for communicating signals between the separate circuits. Of course, while separate integrated circuits are discussed, the circuits may be integrated into a common integrated circuit board in various embodiments. Additionally, the integrated circuits may be combined into fewer integrated circuits or divided into more integrated circuits.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a graphics processing unit (GPU), a CD, other optical medium, a RAM, a ROM, a memory chip or card, a memory stick, and other media from which a computer, a processor or other electronic device can read. In the context of this document, a computer-readable storage medium may be any tangible medium that can contain or store a program for use by or in connection with an instruction execution system, apparatus, or device.

The following includes definitions of selected terms employed herein. The definitions include various examples and/or forms of components that fall within the scope of a term and may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that, when executed, perform an algorithm so on. In one or more embodiments, a module may include one or more CMOS gates, combinations of gates, or other circuit components. Where multiple modules are described, one or more embodiments may include incorporating the multiple modules into one physical module component. Similarly, where a single module is described, one or more embodiments distribute the single module between multiple physical components.

Additionally, module, as used herein, includes routines, programs, objects, components, data structures, and so on that perform tasks or implement data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), as a graphics processing unit (GPU), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
    a coolant loop acting as a conduit for a coolant for cooling a fuel cell, the coolant loop having a first portion having a terminal end with an opening and a second portion fluidly connected to the first portion;
    an ion exchanger configured to deionize the coolant;
    a conductivity sensor configured to output an electrical signal indicating a conductivity of the coolant, the conductivity sensor at least partially disposed within the opening; and
    a processor in communication with the conductivity sensor and a memory, the memory having a conductivity monitoring module having instructions that, when executed by the processor, cause the processor to:
        determine the conductivity of the coolant based on the electrical signal from the conductivity sensor, and
        determine when the ion exchanger requires servicing based on the conductivity of the coolant.

2. The system of claim 1, wherein the conductivity sensor is attached to the first portion of the coolant loop that is upstream from the fuel cell.

3. The system of claim 1, wherein the conductivity sensor is attached to the first portion of the coolant loop that is downstream from the fuel cell.

4. The system of claim 1, wherein the coolant loop includes a bypass, the ion exchanger being fluidly connected to the bypass.

5. The system of claim 1, wherein the fuel cell is a hydrogen fuel cell.

6. A system comprising:
    a coolant loop acting as a conduit for a coolant for cooling a fuel cell;
    an ion exchanger fluidly connected to the coolant loop and configured to deionize the coolant;
    reservoir fluidly connected to the coolant loop;
    a conductivity sensor at least partially disposed within the reservoir and configured to output an electrical signal indicating a conductivity of the coolant within the reservoir; and
    a processor in communication with the conductivity sensor and a memory, the memory having a conductivity monitoring module having instructions that, when executed by the processor, cause the processor to:
        determine the conductivity of the coolant within the reservoir based on the electrical signal from the conductivity sensor, and
        determine when the ion exchanger requires servicing based on the conductivity of the coolant.

7. The system of claim 6, wherein the fuel cell is a hydrogen fuel cell.

* * * * *